Nov. 17, 1964  P. KOSAR  3,157,107
APPARATUS FOR VENTILATING CHAMBERS
IN POWER WASHERS AND THE LIKE
Filed Sept. 13, 1961  3 Sheets-Sheet 1

INVENTOR
PETER KOSAR
BY
Curtis, Morris & Safford
ATTORNEYS

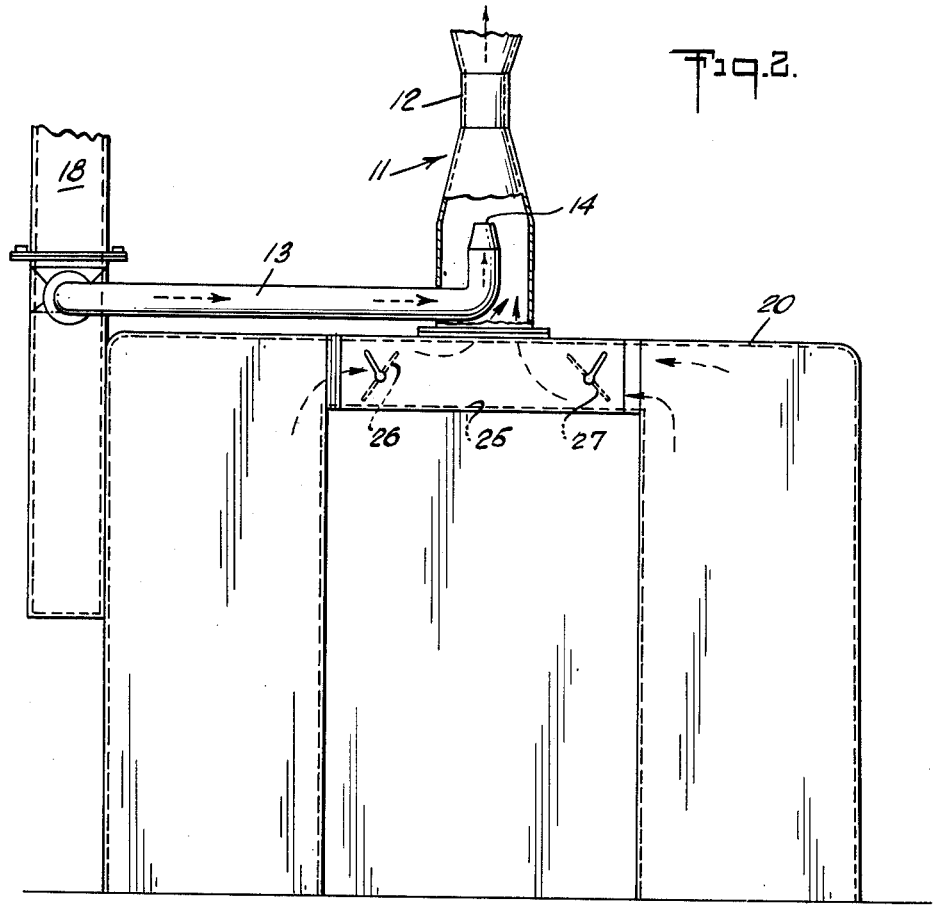
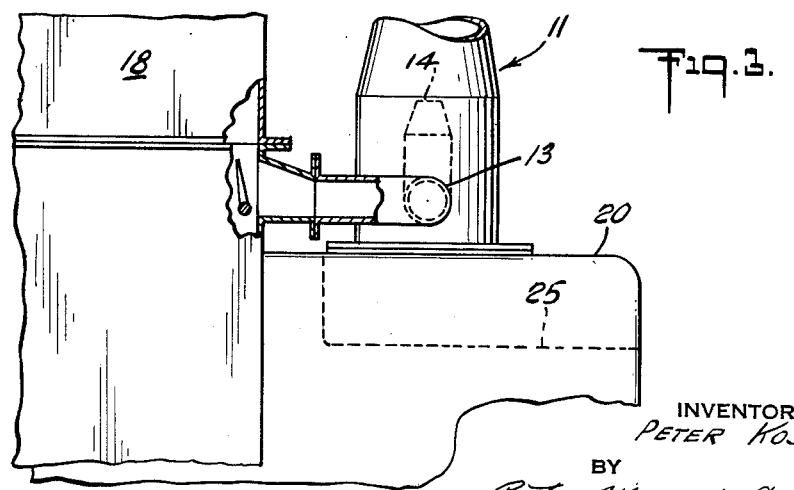

Nov. 17, 1964

P. KOSAR 3,157,107

APPARATUS FOR VENTILATING CHAMBERS
IN POWER WASHERS AND THE LIKE

Filed Sept. 13, 1961

INVENTOR
PETER KOSAR

BY
Curtis, Morris & Safford
ATTORNEYS

United States Patent Office 3,157,107
Patented Nov. 17, 1964

3,157,107
APPARATUS FOR VENTILATING CHAMBERS IN POWER WASHERS AND THE LIKE
Peter Kosar, Garden City, Mich., assignor to Ajem Laboratories, Inc., Livonia, Mich.
Filed Sept. 13, 1961, Ser. No. 137,808
3 Claims. (Cl. 98—115)

This invention relates to devices for ventilating chambers of power washers for ferrous metal parts, and particularly for assuring the ventilation of spaces therein which with use of simple ordinary ventilation ducts tend to become stagnant.

With the trend to washing of industrial parts with water solutions whether near ambient room condition or elevated temperature, a high amount of evaporated water occurs as well as other air borne volatile products. The accumulation of these volatile products builds up partial pressures within these confined washer chambers which has several adverse effects. With the continual generation of vapors of the more volatile materials such as water, the partial pressure drives out other air borne mixtures which are experienced at the inlet or exit to a washer. Another adverse effect from high humidity is the result of condensation on the interior of the unit or on the parts being washed, which can cause accelerated rusting.

With the more complex internal structures of these power washers, including abrading units, having chambers with the high humidity, more engineering skill is required to properly remove the air pollutants, inclusive of excessive concentration of water vapor. This has prompted several ways to overcome the conditions. The needs may be summarized as follows:

(a) *Need to overcome rusting of ferrous metals.*—An improved ventilation system is required to overcome the rusting of ferrous metal products being processed as well as the internal sections of the unit made out of ordinary iron or steel. The complaints from the field even on the better commercial power washers have been numerous for parts suffering condensation and rusting at an entrance or within the unit, particularly after a period of standing, accompanied by condensation of water vapor.

(b) *Need to overcome bacterial action which is presumably accelerated in closed chambers.*—Particularly in the case of washers operating at ambient room temperatures, the humidity becomes high in the wash chamber and the temperatures may be favorable for harboring bacteria that thrive on fresh soils coming into the washer. When bacteria start growing and there is lack of moving air, that condition helps the spread of bacteria. With these static conditions and high humidity at warm or hot temperature the growth of bacteria is rapid and by-products are formed, giving objectionable stenches.

(c) *Need to eliminate condensation of water vapor.*— When a power washer is in normal operation, the spray within it causes considerable convection and atmospheric circulation and some condensation, although less than occurs when the unit is shut down and cooling, is taking place. It has been proven by field investigation, as well as tests, that droplets form rapidly on metal parts that have been left in the saturated water vapor in the unit and also on the interior of the washing chamber. Within a few minutes this condensed water with dissolved oxygen sets up rapid oxidization and rusting.

(d) *Need to avoid accumulation of odors.*—Even with minimized presence of bacteria, various soils which are introduced, and their subsequent degradation and/or chemical reaction, produce objectionable odors. In the inferior washers which are not properly engineered, the odor can build up quickly to a concentration that is objectionable to the workers in the vicinity. Therefore, it is imperative to find methods and arrangements to prevent these odors and/or to discharge the air to the outside before any objectionable concentration of odorous by-products can occur within.

(e) *Need to balance ventilation in different sections of enclosures.*—One of the important needs for the chambers were high humidity and objectionable air-borne materials collect is for the proper balancing of ventilation, not only when the unit is idle but also when it is functioning. These problems are serious, particularly in wash and rinse sections because of the spray and atomization that take place there. Even when the better washers that have some exhaust equipment are provided, it is found that stagnant areas still occur within the washers where adequate ventilation is not attained.

(f) *Need to ventilate from one fan and one control.*— When a customer is advised that there ought to be two or more ventilating fans to remove the pollutants or moist air from the wash-or rinse-or adjacent, chambers, objection is registered. This presents a challenge to solve these needs with the simplest of fan arrangements to pull out the stagnant air.

It is generally recognized that an exhaust fan is needed, particularly for the highly agitated atmosphere of the wash chamber. The placement of the exhaust fan is influenced many times by location of other accessory equipment, the exhaust fan being placed wherever there happens to be an open space, generally on the top side of the unit. This may be remote from where the ventilation should be accomplished, and, though there may be multiple inlets to the exhaust fan, still there are sections in the chamber that are not adequately exhausted.

According to the present invention one or more exhaust or blower fans located conveniently, can be used to serve one or more ventilating ducts from a chamber or chambers of such washers. Such fan acts both directly through said duct to draw out atmosphere from the chamber or to blow fresh air into it and indirectly, through a consequent, or "slave" device operating by reaction to the primary flow in said duct, to suck out some of the chamber's atmosphere through an auxiliary duct. Such a device may operate like an eductor jet or in general on the Bernouilli principle that acceleration of a fluid in a confined passage results in reduction of pressure— hence the auxiliary duct may lead through an orifice into a portion of the main duct which is constricted, e.g., by constriction of its bore or by interposing into its bore some other part which reduces the open cross sectional area or one may drive the gases along the tube by a pressure jet and thus create suction at the inlet. I shall refer to the former type of reaction device herein as a "Venturi" and to the latter type as an "Eductor." The auxiliary duct may be brought through the wall of the main duct, either between the chamber and the fan or beyond the fan, with an orifice or orifices from the auxiliary duct into a constricted throat of the main duct e.g., where it is, at least partially, throttled down by the presence therein of the auxiliary duct.

While such reaction suction devices are not new, this use of such a device to support and amplify an exhaust fan for removal of fumes, had not been known or seen on any power washer.

In this specification and the accompanying drawings I have shown and described a preferred example and certain modifications and alternatives. These are given for purposes of illustration in order that others skilled in the art may fully understand the invention and the principles thereof and will be enabled readily to apply it in practical use and to modify and adapt it as may be best suited to the conditions of each particular use. These are not, and are not intended to be exhaustive of all such modifications or even of all desirable modifications.

In these drawings:

FIGURE 2 is a diagrammatic front elevation partly broken away in vertical section and partly in phantom;

FIGURE 3 is a fragmentary elevation taken from the left side of FIGURE 2 and partly broken away to show parts in vertical section;

Figure 1:
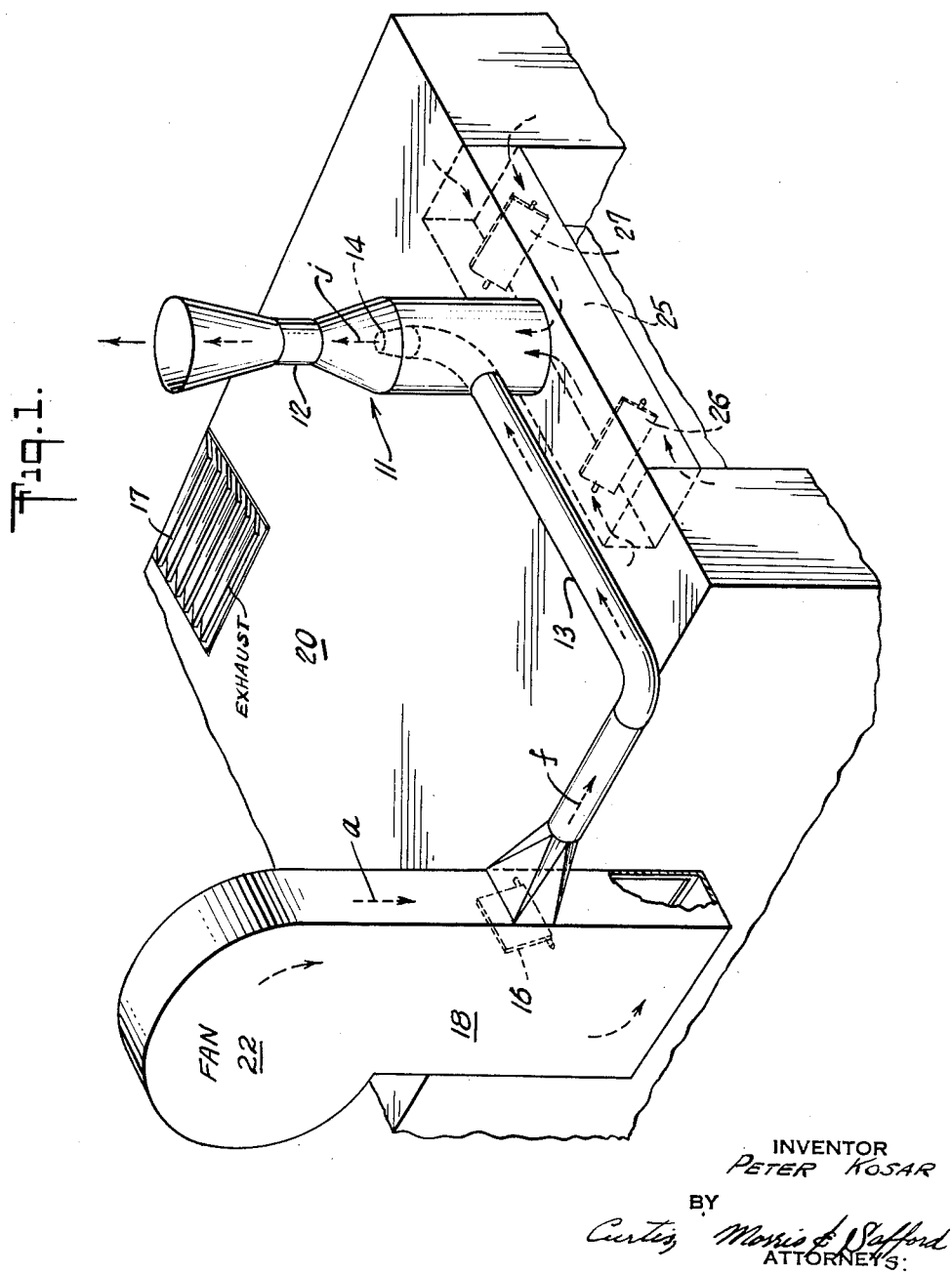
FIGURE 1 is a diagrammatic perspective view partly in phantom and partly broken away.

In FIGURES 1 and 2, an eductor type apparatus is shown as a vertical auxiliary exhaust duct 11. It will be noted that this exhaust duct is constricted at 12, e.g., from 9" in the main duct to 5" in the constricted portion, thus giving a Venturi throat. The eductor is formed by bringing into the entrance of the constricted Venturi section 12, a jet duct 13. This jet duct extends through the wall of the exhaust duct 11 and is positioned with its jet orifice 14 coaxial with, and just below, section 12 there. The air flow direction is shown by the arrows a, f and j. The flow of the larger bulk of air from a main blower 22 along the direction a in duct 18 and on into the housing causes a part of the flow to be caught by the damper valve 16, and diverted through the duct 13 in the direction of arrow f to the jet 14 which acts to suck air through the duct 11.

The main flow from the fan goes on into the housing 20 and out through spray eliminators 17 to the atmosphere or to the ducts for carrying it to a suitable location for discharge to the atmosphere. In the latter case all or part of the exhaust flow in such ducts can be used in a Venturi or an eductor type apparatus to create the auxiliary suction. In either case, the air flow required for the reaction device can be taken from a portion of the main flow of air induced by the fan 22 through a duct, such as 18, and is led to the reaction suction device 11, 12, 14 by a duct 13.

While the air volume handled in the duct 11 may not be large, still it is positive and proportioned to the main flow produced by the fan, and thus can be adequate for ventilating remote stagnant internal areas of a chamber. Although in FIGURE 1 the exhaust duct 11 is shown vertical, it may be in the horizontal or other position, with the jet orifice 14 coaxial with the constricted Venturi throat.

FIGURE 1 shows the jet duct 13 running horizontally, carrying the air from the wash chamber or other chamber or section in a chamber to which the duct is connected.

It should be explained that the fan 22 may be located at 18 (as illustrated) instead of beyond it, or if there is pressure in the housing 20, whatever means are used to develop it, the duct 13 may be connected to tap that pressure and the resultant flow used for the eductor jet 14. Also, as will be hereinafter illustrated in FIGURES 4 to 6, a suction pump 22 may be used on the main exhaust duct 21a beyond the Venturi orifice 14a. In short, any primary ventilating flow of gases, however established, can be used according to the present invention by a reaction suction device to assure ventilation of stagnant areas of an apparatus. Dampers or other means known in the art can be used to regulate the amount of air coming from the fan or blower etc., or drawn through the exhaust duct; but where possible, it is advantageous to design the fan and duct work for an optimum flow requirement and to operate it without adjustment or interposition of any devices which would interfere with smooth flow.

Figure 4:
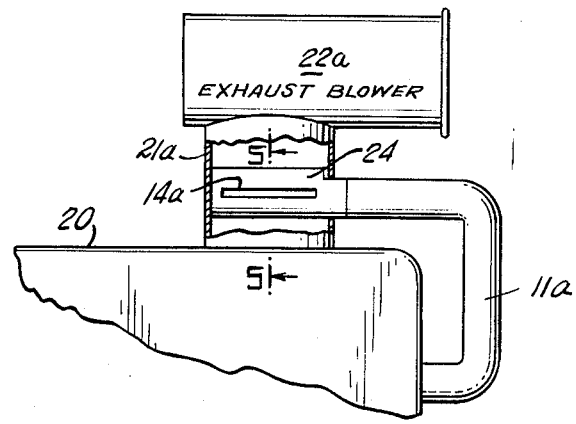
FIGURE 4 is a fragmentary view of one corner of a washer similar to FIGURE 1 but with a modified structure.
Figure 5:
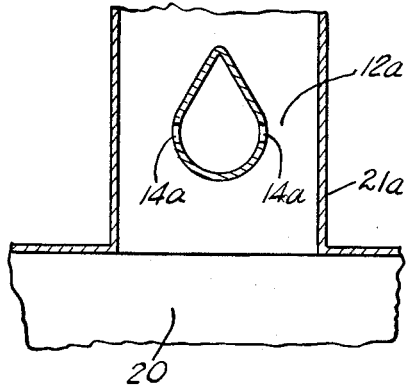
FIGURE 5 is a transverse vertical section taken on line 5—5 of FIGURE 4.

Referring to FIGURES 2, 4 and 5, the wash chamber is again shown diagrammatically at 20. A suction fan 22a above the main exhaust duct 21a in FIGURES 4-6 takes the place of the fan 22 in FIGURE 1, but is a suction fan instead of a blower, as it is positioned at the exit end of the duct 21a. This fan 22a is connected to housing 20 by the duct 21a. The fan here, as in FIGURE 1, is shown diagrammatically by the general shape of its housing, as the various structures available are well known. An auxiliary exhaust duct 11a leads from the opposite side of the chamber and into the duct 21a at 14a, it extends across the duct, as shown in FIGURE 4 constricting the air passage therethrough as shown in FIGURE 3. Orifices 14a at opposite sides of the duct end 24 open into the constricted throat passages 12a. The duct end 24 within the duct 11a is advantageously formed to a streamline shape to facilitate flow in the duct.

Figure 6:
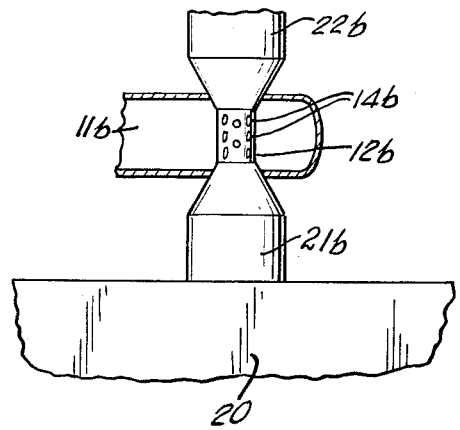
FIGURE 6 is a fragmentary view partly in vertical section showing another modified structure.

FIGURE 6 shows another embodiment of the invention of the Venturi type. In this case, a portion of the main suction fan is shown at 22b drawing air through the duct 21b. This duct is constricted near its center to form a Venturi throat 12b which is provided with multiple orifices 14b communicating with the end of duct 11b which surrounds throat 12b. The constriction at 12b of duct 21b increases the velocity of gas flow, which, in accordance with Bernouilli's principle causes reduction of pressure which sucks air through orifices 14b from the surrounding duct 11b.

Among the advantages of this device a few may be mentioned:

(1) The auxiliary reaction type exhaust energized by a main exhaust system enables better ventilation from one fan and electrical control.

(2) With the use of this auxiliary ventilating duct system extending to otherwise stagnant parts of a chamber, the stagnant conditions can be eliminated.

(3) With the use of a properly located Venturi with auxiliary duct pipes, selected parts of a chamber, or of some auxiliary smaller chamber may be air conditioned to eliminate condensation of moisture on the internal sections of a unit.

(4) The installation of these auxiliary suction ducts helps to overcome rusting conditions on the equipment, the accumulation of odors and growth of bacteria.

(5) The proposed auxiliary suction duct is better adapted for installing and localizing the inlet than with main duct systems.

(6) It is in the scope of the invention to introduce the auxiliary suction duct, not only in the exhaust duct leading away from the exit side of the fan, but it may also be introduced into the respective suction ducts that are feeding into, or beyond, an exhaust fan.

(7) The varied requirements for exhausting particular parts of a chamber may be matched by the size and position of the auxiliary suction duct and also a Venturi can be designed and positioned to match best operating conditions for the c.f.m. in the ducts. This allows latitude as to position of the auxiliary suction duct.

The exhaust duct 11 may be easily connected to any section of a chamber, and specifically may be led to a particular position within the chamber to suck out the objectionable pollutants in its atmosphere. In the example shown, open-ended chamber 25 (see particularly FIGURE 2) serves to branch duct 11 in order to reach the stagnant areas at opposite sides of housing 20. These end-openings in chamber 25 are shown as being respectively controlled by dampers (butterfly valves 26 and 27) with operating levers and quadrants on the front of chamber 20.

With the auxiliary suction duct made of pipe, and using simple standard fittings, quick installations may be accomplished without mutilating or doing extensive change in a power washer wall and assembly.

With such an auxiliary suction duct system it is easy to assure ventilation of remote, confined or otherwise stagnant compartments which would not be adequately ventilated by the ordinary ducts to a fan. When multiple suction ducts run to a single exhaust fan, an auxiliary duct inlet to bring other pollutants may be placed in each of several points in the main ducts.

It is also feasible and within the scope of the invention to put in two or more of these auxiliary ducts and orifices along the main ventilating duct where they will have c.f.m. capacity from the fan sufficient to produce a desired reaction suction.

It is recognized that there are a number of variations possible as to where one can best tap into a chamber for the auxiliary suction duct and where to locate the outlet of the auxiliary duct into the main duct.

It should be understood that when the word "fan" is used herein it includes other devices for moving air, etc., and is not limited to rotary blade devices.

I claim:

1. In a power washer or like apparatus having a tendency to develop corrosive, bacterial or odor conditions therein, the combination of a housing, a fan for flowing a ventilating atmosphere through said housing, said housing having at least one stagnant portion and normally unaffected by the main flow created by said fan, a main duct extending between said fan and said housing and adapted to handle at least a substantial portion of said main flow, a Venturi device comprising a constriction in the cross-sectional area of flow of said main duct and at least one orifice into said main duct at said constriction whereby a Venturi suction effect through said orifice is produced into said main duct, and an auxiliary duct connected from at least one of said stagnant portions of said housing and terminating around said orifice to conduct an auxiliary ventilating flow therealong.

2. In a power washer or like apparatus having a tendency to develop corrosive, bacterial or odor conditions therein, the combination of a housing, a fan for flowing a ventilating atmosphere through said housing, said housing having at least one stagnant portion normally unaffected by the main flow created by said ventilating means, a main duct extending between said fan and said housing adapted to handle at least a substantial portion of said main flow, an auxiliary duct connected with at least one of said stagnant portions of said housing to conduct an auxiliary ventilating flow from the housing to the atmosphere, a jet duct connected at one end of said main duct to receive a portion of the main flow and connected to said auxiliary duct at the other end and terminating within said auxiliary duct in a jet directed out along said auxiliary duct, said jet end of said jet duct serving as an eductor to create said auxiliary ventilating flow.

3. In a power washer or like apparatus having a tendency to develop corrosive, bacterial or odor conditions therein, the combination of a housing, a fan for flowing a ventilating atmosphere through said housing, said housing having at least one stagnant portion normally unaffected by the main flow created by said fan, a main duct extending between said fan and said housing and adapted to handle at least a substantial portion of said main flow, a Venturi device comprising a constriction in the cross-sectional area of flow of said main duct and at least one orifice into said main duct at said constriction whereby a Venturi suction effect through said orifice is produced into said main duct, and an auxiliary duct connected from at least one of said stagnant portions of said housing and terminating at said constriction in communication with said main duct through said orifice, thereby to conduct an auxiliary ventilating flow therealong, said constriction of the cross-sectional area of flow of the main duct being formed by the interposition of said auxiliary duct into the main duct.

References Cited in the file of this patent

UNITED STATES PATENTS

| | | |
|---|---|---|
| 116,049 | Gouge | June 20, 1871 |
| 1,267,808 | Self | May 28, 1918 |
| 1,391,216 | Stewart | Sept. 20, 1921 |
| 1,922,070 | Anderson | Aug. 15, 1933 |
| 2,311,948 | Lagodzinski | Feb. 23, 1943 |
| 2,607,281 | King | Aug. 19, 1952 |